(12) United States Patent
McBrien

(10) Patent No.: US 8,050,555 B2
(45) Date of Patent: Nov. 1, 2011

(54) OPTICAL PHASE MODULATOR WITH MONITORING STRUCTURE

(75) Inventor: Gregory J. McBrien, Glastonbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 574 days.

(21) Appl. No.: 12/250,651

(22) Filed: Oct. 14, 2008

(65) Prior Publication Data
US 2009/0097843 A1    Apr. 16, 2009

Related U.S. Application Data

(60) Provisional application No. 60/980,263, filed on Oct. 16, 2007.

(51) Int. Cl.
*H04B 10/08* (2006.01)
*H04B 17/00* (2006.01)

(52) U.S. Cl. .......................................................... 398/16

(58) Field of Classification Search .................... 398/13, 398/16, 17, 33, 186, 188
See application file for complete search history.

(56) References Cited

U.S. PATENT DOCUMENTS

| | | | |
|---|---|---|---|
| 6,181,429 B1 | 1/2001 | Barberis et al. | 356/477 |
| 7,197,251 B2 | 3/2007 | Choudhary et al. | 398/188 |
| 7,389,055 B1 | 6/2008 | Rickard et al. | 398/206 |
| 2004/0081470 A1 | 4/2004 | Griffin | 398/188 |
| 2004/0141222 A1 | 7/2004 | Miyazaki et al. | 359/237 |
| 2006/0133713 A1* | 6/2006 | Yamada et al. | 385/5 |
| 2007/0264028 A1* | 11/2007 | Yuki et al. | 398/183 |

* cited by examiner

*Primary Examiner* — Ken Vanderpuye
*Assistant Examiner* — Jermaine Wilson
(74) *Attorney, Agent, or Firm* — Matthew A. Pequignot; Pequignot + Myers LLC

(57) ABSTRACT

The invention relates to an optical waveguide device that includes a waveguide phase modulator (WPM). A waveguide monitoring structure is coupled optically in parallel with the WPM so as to form a Mach-Zehnder interferometer therewith for producing monitor light indicative of a phase shift imparted by the WPM. The waveguide monitoring structure includes a first optical tap for tapping off a fraction of light entering the first WPM for providing first tapped-off light, a second optical tap for tapping off a fraction of light exiting the first WPM for providing second tapped off light, and an ancillary phase modulator for modulating the optical phase of the first or second tapped-off light so as to modulate the intensity of the monitor light in dependence upon the first phase shift. A feedback circuit controls the phase shift imparted by the WPM based on a modulation index of the monitor light.

18 Claims, 5 Drawing Sheets ent Application No. 60/980,263 filed Oct. 16, 2007,
OPTICAL PHASE MODULATOR WITH MONITORING STRUCTURE

CROSS-REFERENCE TO RELATED APPLICATIONS

The present invention claims priority from U.S. Provisional Patent Application No. 60/980,263 filed Oct. 16, 2007, entitled "Optical Modulator With Series Intensity Modulators, and Multiple Phase Modulators With Waveguide Constructed Monitoring Structures", which is incorporated herein by reference.

TECHNICAL FIELD

The present invention relates generally to optical waveguide devices, and more specifically to optical waveguide modulators with optical phase monitoring.

BACKGROUND OF THE INVENTION

Optical waveguide modulators are commonly used to modulate light generated by lasers and other light sources. In optical communications, different phase modulation schemes may be advantageously employed, which include Phase Shift Keying (PSK) methods such as Binary Phase Shift Keying (BPSK), Quadrature Phase Shift Keying (QPSK) and Differential Quadrature Phase Shift Keying (DQPSK). Return-to-Zero Phase-Shift Keying (RZ-PSK) is characterized by the phase modulation of a train of optical pulses, and may have beneficial properties in combating distortions seen in fiber optic cables at longer distances compared to a simpler Non Return-to-Zero (NRZ) PSK modulation, wherein light intensity remains unchanged. By using PSK-based communication schemes, the capacity and link performance can be enhanced in comparison with direct detection schemes utilizing On-Off amplitude keying.

In PSK modulation, data is transmitted by controlling the phase of an optical carrier, e.g. laser light, in accordance with the transmission data. For example, in QPSK modulation, the optical phase of the optical carrier is switched between four values "θ", "θ+π/2", "θ+π", and "θ+3π/2", where "θ" is an arbitrary phase, which are assigned respectively to two-bit symbols "00", "10", "11", and "01". A receiver device recovers the transmission data by detecting the phase of the received optical signal.

In DQPSK modulation, the transmitted data are differentially encoded, that is, they are represented by the difference in phase between successive symbol intervals. In this technique, in each successive symbol interval the modulator imparts one of four possible phase shifts (0, π/2, π, 3π/2) on the optical carrier, while the receiver measures the phase difference between two successive received symbols, so that the absolute phase of the optical carrier is not needed to decode the transmitted symbols.

Optical modulators for DQPSK and QPSK modulation are known in the art, and typically utilize waveguide structures formed in electro-optic materials such as $LiNbO_3$ or compound semiconductors having suitably high electro-optic coefficients, for example GaAs or InP based. Conventionally, such modulators include two or more waveguide BPSK modulators, i.e. waveguide phase modulators that are driven by binary electrical signals and impart one of two phase shift values on light passing therethrough. The same optical structure can be used for either the QPSK or DQPSK modulation, with different pre-coding of electrical drive signals in each case.

A typical waveguide phase modulator includes a waveguide formed in or upon an electro-optic material disposed between a pair of electrodes extending alongside the waveguide adjacent thereto so as to induce an electrical filed in the waveguide. By applying a drive voltage across the electrodes, a change in the refractive index of the waveguide can be affected, thereby changing the optical phase acquired by guided light at the output of the phase modulator.

One common type of (D)QPSK modulators utilize a Mach-Zehnder (MZ) waveguide structure, wherein output ports of an optical splitter are connect with input ports of an optical combiner by two waveguide arms. Mach-Zehnder electro-optic modulators (MZMs) are widely used as optical intensity modulators and have an optical transmission versus drive voltage characteristic which is cyclic and is generally raised cosine in nature. The half period of the MZM's characteristic, which is measured in terms of a drive voltage, is defined as $V_\pi$. In order to operate as a QPSK or DQPSK modulator, each MZ arm includes a phase modulator driven by a data signal that may impart either a 0 or π phase shift upon light propagating in the respective arm, with one of the arms including an additional π/2 phase shifter.

For example, US Patent Publication 2004/0081470 to Griffin discloses such an optical QPSK modulator wherein the phase modulators in the waveguide arms are in turn MZMs that are biased for minimum optical transmission in the absence of a drive voltage and are driven with respective drive voltages $V_I(t)$, $V_Q(t)=+/-V_\pi$ to give abrupt phase shifting with a minimum of amplitude modulation. Such an MZM based phase modulator produces light wherein the optical phase abruptly switches by π radian, crossing a zero intensity. One disadvantage of this MZM-based phase modulator is the appearance of a third harmonic of the modulation frequency in the optical spectrum of the output light. A further disadvantage of this scheme, is that the MZM must be driven to $2 \cdot V_\pi$ drive voltage in order to produce the 0 to π phase shift.

It is also known to sequentially connect two or more binary phase modulators to provide multi-level phase modulation of light. US Patent Application No 2004/0141222, in the names of T. Miyazaki and K. Kikuchi, discloses an m-ary PSK modulator that produces multi-level phase modulation by utilizing a plurality of binary phase modulators disposed in series, wherein n-th phase modulator produces a phase shift of either 0 degrees of $2^n \phi$ degrees; here, $\phi$ is a predetermined phase level. For example, by using two phase modulators connected in series, either DQPSK or QDPSK modulation can be realized.

To provide a high-quality DQPSK or QDPSK signal and ensure error-free reception of transmitted signal, it is important that the phase shifts imparted by the phase modulators are equal or very close to design values. If uncontrolled, the phase shifts imparted by the phase amplifiers may vary with time, for example due to device aging or changes in environmental conditions such as temperature, which may cause changes in material properties of the waveguide or in characteristics of driving circuitry. Therefore, there is a need to monitor the phased shifts imparted by the device to ensure its correct operation. One problem with using sequentially connected phase modulators to modulate the optical phase of light is that the optical phase is considerably more difficult to monitor than the light's intensity. A conventional photodetector capable of detecting light intensity will not respond to the phase shift portion of the optical signal.

An object of the present invention is therefore to provide a waveguide optical device that includes a waveguide phase modulator and integrated means for monitoring the optical phase shifts imparted by the waveguide phase modulator upon light propagating therethrough.

SUMMARY OF THE INVENTION

In accordance with the invention, an optical waveguide device is provided, comprising: an input optical port for launching light therein; an output optical port for emitting modulated light; a first waveguide phase modulator (WPM) optically coupled between the input and output optical ports for imparting a first phase shift onto light propagating therethrough in response to an electrical drive signal; and, a first waveguide monitoring structure (WMS) coupled optically in parallel with the first WPM so as to form a Mach-Zehnder interferometer (MZI) therewith for producing monitor light indicative of the first phase shift imparted by the first WPM.

The first waveguide monitoring structure comprises: a first optical tap for tapping off a fraction of light entering the first WPM for providing first tapped-off light, a second optical tap for tapping off a fraction of light exiting the first WPM for providing second tapped off light, a monitor port optically coupled to the first and second optical taps for providing the monitor light wherein the first tapped-off light is mixed with the second tapped-off light, and an ancillary phase modulator (APM) for modulating the optical phase of one of the first and second tapped-off light with a test signal so as to modulate the intensity of the monitor light in dependence upon the first phase shift.

In accordance with another aspect of this invention, the optical waveguide device comprises a substrate and a plurality of WPMs formed with an electro-optic material upon the substrate and including the first WPM, the WPMs optically coupled in series between the input optical port and the output optical port for imparting phase shifts upon light propagating therethrough.

A plurality of waveguide monitoring structures including the first waveguide monitoring structure is formed with an electro-optic material upon the substrate, wherein each of the waveguide monitoring structures is coupled optically in parallel with a different one of the WPMs so as to form a Mach-Zehnder interferometer (MZI) therewith, and includes a dedicated monitor port for providing monitor light indicative of the optical phase shift in the respective WPM.

Another aspect of the present invention relates to an optical modulator comprising: a first photodetector optically coupled to the first monitor port for detecting the monitor light and for generating an electrical photodetector signal responsive to variations of the intensity of the monitor light associated with the test phase signal the optical waveguide device, a data signal generator for generating the electrical drive signal so as to modulate the first phase shift with a pre-defined phase modulation amplitude, a test signal generator for generating the electrical test signal for modulating the optical phase of light propagating through the APM.

A feedback circuit electrically coupling the first photodetector and the data signal generator is further provided for adjusting the drive signal based on the electrical photodetector signal, wherein the feedback circuit comprises a control signal generator for generating a control signal based on a modulation index of the electrical photodetector signal.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION OF EXEMPLARY EMBODIMENTS

Figure 1:
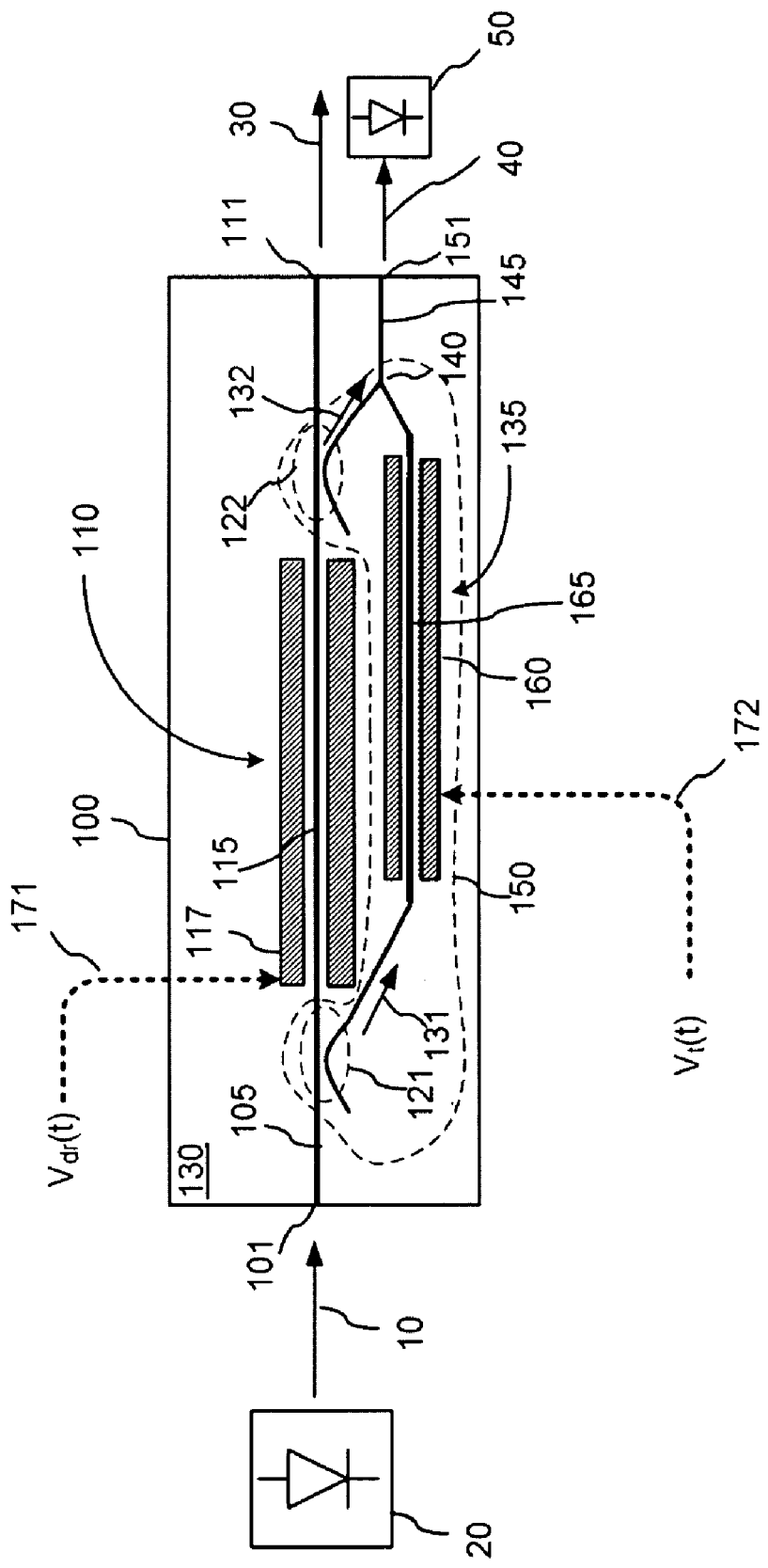
FIG. 1 is a diagram of a waveguide phase modulator with an integrated monitoring structure incorporating a Y-junction waveguide combiner.

In various embodiments, the optical waveguide device (OWD) of the present invention is preferably an integrated optical device that is formed with electro-optic material upon or within a single substrate. The substrate may be made of an electro-optical crystal including but not limited to GaAs, InP, or $LiNbO_3$, or may be made of a non-electro-optic material, with an electro-optic material disposed upon it to form optical waveguides with electrically controllable parameters. In some embodiments, different cuts of a monolithic $LiNbO_3$ crystal, including but not limited to X, Y, or Z cuts, are utilized as the substrate; in these embodiments, optical waveguides can be formed within the $LiNbO_3$ substrate by in-diffusion of suitable impurities as known in the art. Optical devices including $LiNbO_3$-based have been described in, for example, U.S. Pat. Nos. 5,416,859, and 5,526,448, which are incorporated herein by reference to the extent necessary to understand the present invention. In another embodiment, optical waveguide structures are formed upon a semiconductor substrate of a suitable material such as GaAs or InP using epitaxial deposition of semiconductor layers followed by etching. Integration of all components in a single chip, such as a $LiNbO_3$ chip, reduces the cost, improves performance, and provides better stability and control. The optical waveguide device of the present invention integrated on a single chip can be used for any combination of phase and amplitude modulation such as QPSK, M-ary phase modulation, quadrature amplitude modulation (QAM), and the like. The optical waveguide device of the present invention may be formed as integrated on a single chip using a variety of technologies that are known in the art, which can include but not limited to epitaxial deposition of waveguide layers, metal in-diffusion and/or (annealed) proton-exchange technology, wet etching, reactive ion etching, plasma etching, and others, as would be known to those skilled in the art.

FIGS. 1-4 illustrate four exemplary embodiments of the optical waveguide device (OWD) of the present invention, which however is not limited to these embodiments. In these figures, optical waveguides are shown with thick black lines drawn upon a rectangle block representing the substrate, which can however be of any suitable shape, while electrical connections are schematically illustrated with dotted arrows that simultaneously represent electrical signals provided via said electrical connections. FIG. 5 illustrates an exemplary embodiment of an optical modulator wherein an OWD is furnished with monitoring and control circuitry according to the present invention; in this figure, electrical connections that are external to a rectangular block representing the OWD are indicated with solid lines, while solid lines that are internal to the rectangular block representing the OWD indicate optical waveguides. In FIGS. 1-5, like reference numerals indicate same or similar elements.

Referring first to FIG. 1, there is shown an optical waveguide device (OWD) 100 according to the first embodiment of the invention; it includes an input optical port 101 and an output optical port 111 for coupling light in an out of the OWD 100, and a waveguide phase modulator (WPM) 110 optically coupled between the input and output ports 101, 111. The WPM 110 may be used to modulate the optical phase of light propagating therethrough with a data signal as a part of an optical data transmitter. According to the invention, a waveguide monitoring structure (WMS) 150 with a separate optical monitor port 151 is provided to monitor the WPM 110 during operation and/or at a time of calibration. The WMS 150 is coupled optically in parallel with the WPM 110 so as to form a Mach-Zehnder interferometer (MZI) therewith. In a currently preferred configuration, the WPM 110 and the WMS 150 are integrated in a single chip to form a planar lightwave circuit (PLC). Other embodiments however may utilize bulk, for example fiber-optic, components that perform the same or similar functions as described herein below.

In the shown embodiment, the WPM 110 is formed by providing signal electrodes 117 on both sides of a section 115 of a main optical waveguide 105 adjacent thereto, so as to affect a change of the waveguide refractive index by applying a voltage to the signal electrodes 117 as known in the arts. The main optical waveguide 105 optically connects the input port 101 and the output port 111, and is formed with an electro-optical material upon or within a substrate 130 as known in the arts.

The WMS 150 includes first and second optical tap 121 and 122 disposed at the ends of the WPM 110 so as to tap-off light entering and leaving the WPM 110, an ancillary phase modulator (APM) 160 coupled to the first optical tap 121, an optical combiner 140 that combines light from the first optical tap 121 with light from the second optical tap 122 and couples the combined light into an optical monitor port 151. The APM 160 includes an ancillary waveguide 165 that is optically coupled between the first optical tap 121 and the optical combiner 140, and two test electrodes 160 that are disposed on both sides of the ancillary waveguide 165 adjacent thereto so as to electro-optically modulate the optical phase of light propagating in the ancillary waveguide 165 and to impart thereupon a phase test signal, causing the intensity of the monitor light 40 to vary in accordance.

In operation, light 10, for example from a laser device 20 such as a cw single-mode DFB laser diode, is launched into the input optical port 101, and propagates by way of the main optical waveguide 105 through the WPM 110 towards the output port 111. The WPM 110 imparts an optical phase shift $\Phi$ onto the light 10 propagating therethrough in response to an electrical drive signal $V_{dr}(t)$ that is applied to the signal electrodes 117, as schematically shown by a dotted arrow 171. By way of example, the electrical drive signal $V_{dr}(t)$ 171 is such that the phase shift $\Phi$ imparted by the WPM 110 upon the propagating light switches between two possible values $\Phi_0$ and $\Phi_0+\Delta\Phi$, so that the WPM 110 operates as a BPKS modulator. Here, $\Delta\Phi$ is a specified phase modulation amplitude, and $\Phi_0$ is an arbitrary phase value that can change depending on temperature and device aging, but remains substantially constant over multiple bit intervals and cancels out in differential detection; in the following, $\Phi_0$ is assumed to be 0 without loss of generality. In embodiments described hereinbelow, $\Delta\Phi$ may have a target value that is substantially equal to $\pi/(2^k)$, where k is an integer including 0, although this limitation is not required for the invention and $\Delta\Phi$ may take on any value desired in a particular application. The output port 111 outputs modulated light 30 having the optical phase shift $\Phi$, which may alternate in time in accordance with the drive signal $V_{dr}(t)$.

The purpose of the WMS 150 is to enable monitoring of the phase modulation amplitude $\Delta\Phi$ during the operation, for example when the WPM 110 is modulated with a data signal; accordingly, the WMS 150 will also be referred to herein as the phase monitoring structure. The first optical tap 121 taps off a fraction of light entering the WPM 110 for providing first tapped off light 131, while the second optical tap 122 taps off a fraction of light exiting the WPM 110 for providing second tapped off light 132 and for combining thereof with the first tapped off light 131. As shown in FIG. 1, the first tapped of light 131 from the first optical tap 121 is passed through the APM 135, which modulates the optical phase thereof in response to an electrical test signal $V_t(t)$ applied to the electrodes 160 by adding to the optical phase of the first tapped-off light 131 a test phase signal $\phi(t)$. In another embodiment, the APM 135 may be disposed so as to modulate the second tapped of light 132 from the second optical tap 122. The tapped-off light that passes through the APM 135 is referred to hereinafter also as the test light. The first and second tapped off light 131, 132, with the phase of one of them modulated by the test signal $V_t(t)$, are combined by the optical combiner 140, which has an output waveguide 145 coupled to the monitor port 151. The monitor port 151 provides the combined tapped off light in the form of monitor light 40 wherein the first tapped-off light 131 is mixed with the second tapped-off light 132. A photodetector (PD) 50 is disposed to receive the monitor light 40 from the monitor port 151 for controllably detecting intensity variations thereof in dependence upon the phase shift $\Phi$ imparted by the WPM 110, and for converting them into an electrical signal. The PD 50 can be embodied, for example, as a suitable photodiode that is sensitive to the monitor light and has a suitable bandwidth as described hereinbelow.

As one skilled in the art will appreciate, the WPM 110 and the APM 135 form two arms of an MZI, which also includes the first and second optical taps 121 and 123, and the optical combiner 140. Accordingly, the intensity of the monitor light 40 that is provided from the monitor port 151 is dependent upon a relationship between the test phase signal $\phi(t)$ and the phase shift $\Phi$ in the WP 110. More particularly, the monitor light 40 has an interferometric component $I_m \approx a \cdot I_0 \cdot \cos(\Phi-\phi(t)+\phi_0)$, so that the intensity I of the monitor light 40 varies in dependence on the phase shift $\Phi$ as $$I \approx I_0 \cdot [1+a \cdot \cos(\Phi-\phi(t)+\phi_0)], \qquad (1)$$

where parameter $a \leq 1$ depends upon a ratio of the tap coefficients $\alpha_1$ and $\alpha_2$ of the first and second optical taps 121, 122; the intensity $I_0$ is proportional to the light intensity launched in the main optical waveguide 105 and depends upon the tap coefficients $\alpha_1$ and $\alpha_2$; $\phi_0$ is a constant phase shift that may be nullified by applying a suitable bias voltage to the electrodes 160 of the APM 135. According to equation (1), the WMS 150 converts the phase modulation provided by the WPM 110 into the intensity modulation of the monitor light 40 in dependence upon the test phase signal $\phi(t)$ applied by the APM 135.

When the WPM 110 is driven by a binary NRZ signal, the intensity of the monitor light alternates between two values: $I_1=I_0 \cdot [1+a \cdot \cos(\Delta\Phi-\phi(t))]$ and $I_2=I_0 \cdot [1+a \cdot \cos(\phi(t))]$, corresponding to marks and spaces in the electrical drive signal 171. If the data rate R of the electrical drive signal 171 is much larger than a characteristic frequency f of the test phase signal φ(t), and the electrical drive signal 171 has substantially equal probabilities of marks and spaces, the intensity of the monitor light 30 may be averaged over a time interval T that is much larger than 1/R but is smaller than 1/f, resulting in an averaged monitor signal $I_{av}=(I_1+I_2)/2$ that satisfies equation (2):

$$I_{av}=I \cdot [1+a \cdot \cos(\Delta\Phi/2) \cdot \cos(\phi(t))] \quad (2)$$

Accordingly, slow variations of the test phase signal φ(t) are converted into corresponding variations of the averaged intensity of the monitor signal $I_{av}$ with a conversion efficiency that depends on the phase modulation amplitude ΔΦ of the phase shift Φ imparted by the WPM 110 and is proportional to $\cos(\Delta\Phi/2)$ when the phase shift Φ is NRZ modulated.

Preferably, the fractions of light $\alpha_1$ and $\alpha_2$ that are tapped off from the main optical waveguide 105 by the optical taps 121 and 122, or the tap coefficients, are relatively small, for example less than 10% and preferably between 5% and 1%, so that optical loss between the input and output ports 101, 111 is small. It may be further preferred, although is not required, that the tap coefficients of the first and second optical taps 121, 122 are selected so that the first and second tapped-off light 131, 132 are present in the monitor light 40 with approximately equal intensity, in which case a≈1 so that the interferometric component of the monitor light is maximized, and the averaged monitor signal $I_{av}$ can be estimated from the following equation (3):

$$I_{av}=(I_1+I_2)/2=I \cdot [1+\cos(\Delta\Phi/2) \cdot \cos(\phi(t))] \quad (3)$$

Accordingly, the test phase modulation signal φ(t) provided by the APM 135 is converted into a modulation of the averaged intensity of the monitor light 40 in dependence upon the phase modulation amplitude ΔΦ of the optical phase shift imparted by the WPM 110. Therefore, by monitoring the averaged intensity $I_{av}$ of the monitor light 40 with the PD 50, such as a suitable photodiode which converts the received monitor light 40 into an electrical signal, one can effectively monitor the phase shift ΔΦ imparted by the WPM 110, and adjust the electrical drive signal $V_{dr}(t)$ as required to maintain the target "ON" and "OFF" values of the phase shift Φ during the modulation. In particular, equation (3) shows that when the phase modulation amplitude ΔΦ is equal to exactly π radian, the averaged monitor signal $I_{av}$ is insensitive to the phase modulation of the test light in the WMS 150, and therefore is insensitive to the electrical test signal 172, so that the appearance of the test phase signal φ(t) in the averaged monitor signal may serve as an indicator of that the "ON" voltage setting of the WPM 110 deviates from the $V_\pi$ voltage value of the modulator.

Advantageously, in the embodiment shown in FIG. 1 the first tapped off light 131 that is modulated by the test signal $V_t(t)$ is de-coupled from the output port 111. The combination of the second optical tap 122 and the optical combiner 140, which is embodied here as a Y-junction waveguide coupler, prevents the modulated tapped-off light from the APM 150 from being coupled back into the main optical waveguide 105, so that there is no leakage of the test signal in the modulated output light 111.

Figure 2:
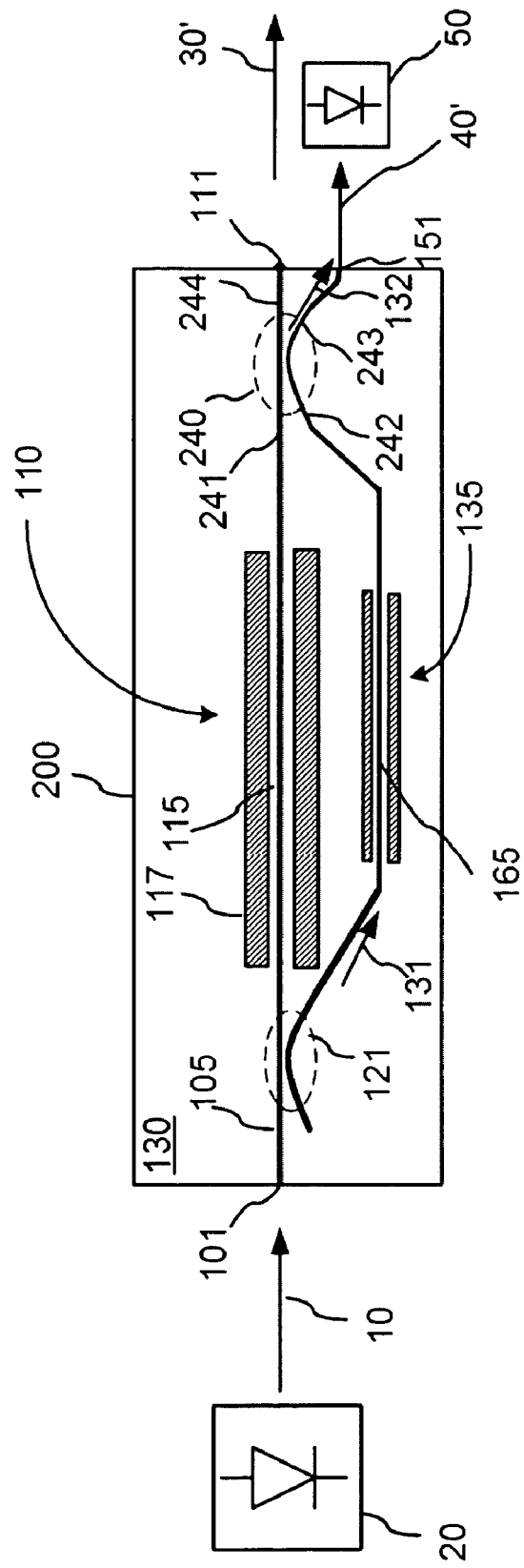
FIG. 2 is a diagram of a waveguide phase modulator with an integrated monitoring structure incorporating a 2×2 optical coupler.

Referring now to FIG. 2, there is shown an OWD 200 according to a second embodiment of the present invention. The OWD 200 is similar to the OWD 100 in every respect, except that the second optical tap for tapping off a fraction of light exiting the WPM 110 is embodied in the OWD 200 as a 4-port optical coupler 240 having a first output waveguide 244 coupled to the output optical port 111, and a second output waveguide 243 coupled to the first optical monitor port 151. Input waveguides 241, 242 of the optical coupler 240 receive outputs from the WPM 110 and the APM 135, respectively. Advantageously, this arrangement does not require the optical combiner 140 of the OWD 100, as its function is performed by the optical coupler 240. Light propagating out of the second output waveguide 243 combines the first tapped off light 131 from the first optical coupler 121 and the APM 135 with the second tapped off light 132 that is coupled out of the main waveguide 105 by the coupler 240. Although in this case some of the of the first tapped off light 131 modulated by the APM 135 is coupled into the main waveguide 105 by the coupler 240 and is therefore present in the modulated light 30' exiting from the output signal port 111, this coupling is proportional to the product of the tap coefficient $\alpha_1$ of the first optical tap 121 and a cross-coupling coefficient $\alpha_{12}$ of the optical coupler 240 and can be rather small provided that both $\alpha_1$ and $\alpha_{12}$ are small, for example less than 5%, or preferably between 3 and 1%. Here, the cross-coupling coefficient $\alpha_{12}$ of the optical coupler 240 is defined as the ratio of light intensity entering the coupler 240 through the second input waveguide 242 to light intensity leaving the coupler 240 through the first output waveguide 242.

Although FIGS. 1 and 2 each show a single WPM 110 with an associated WMS 150 formed upon or within the substrate 130, in other embodiments there may be two or more WPMs formed within or upon a single substrate, preferably each with a dedicated integrated WMS and an associated dedicated monitor port. The substrate 130 as shown in FIGS. 1 and 2 may also be a portion of a larger substrate having a plurality of WPMs, which may be optically coupled either sequentially or in parallel and of which the WMP 110 is one, with at least some of the additional WPMs having associated integrated WMSs coupled optically in parallel thereto to form an MZ-type interferometric configuration with the respective WPM, so that to monitor the phase shifts imparted by the respective WPM independently on the other WPMs via an dedicated monitor port.

Figure 3:
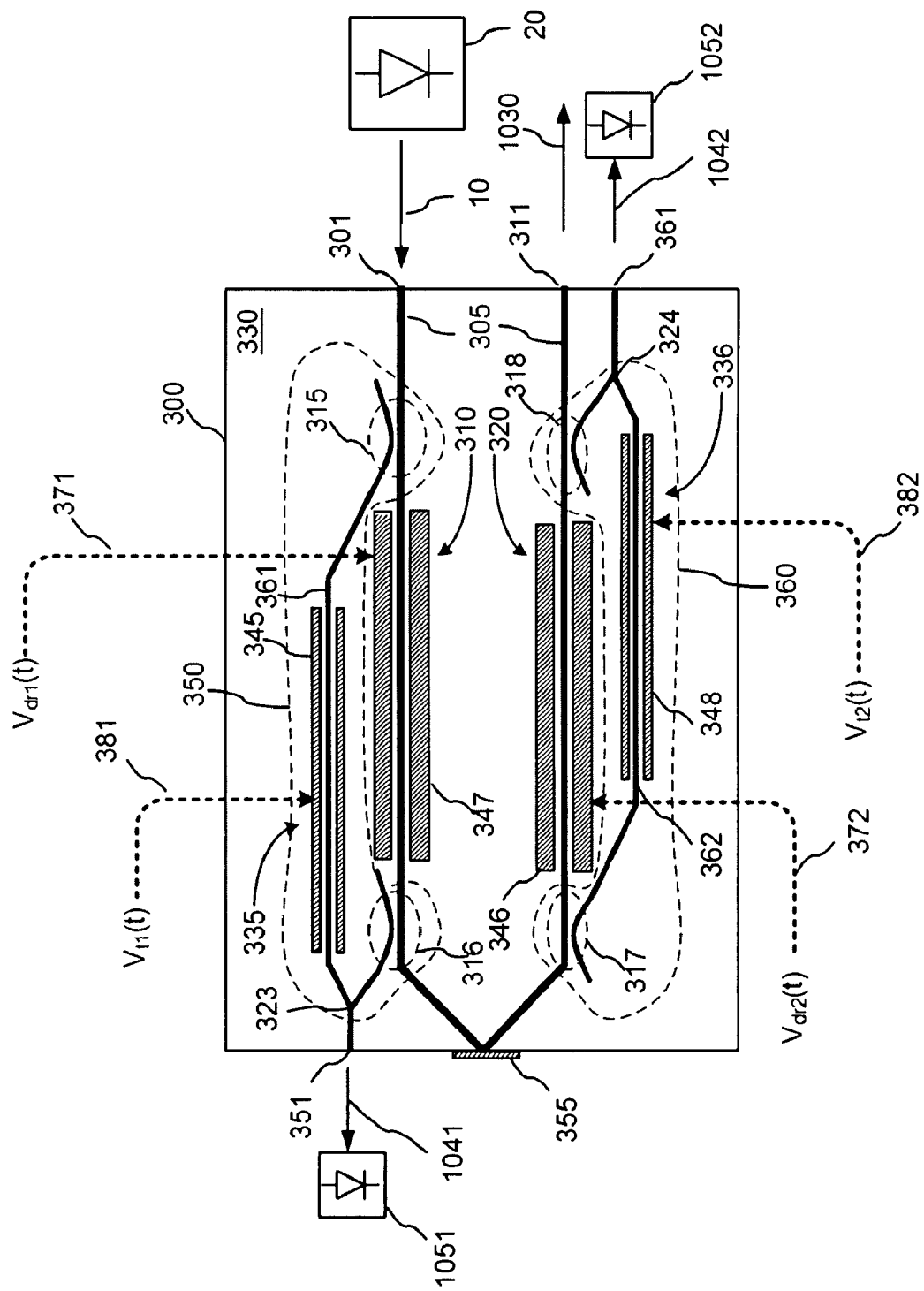
FIG. 3 is a diagram of an optical waveguide device incorporating an NRZ QPSK modulator with integrated phase monitoring structures.

With reference to FIG. 3, there is provided an OWD 300 according to a third embodiment of the present invention. In this embodiment the OWD 300 is an optical QPSK modulator that includes a first WPM 310 and a second WPM 320 connected optically in series in a folded configuration between an input optical port 301 and an output optical signal port 311. A main waveguide 301 is formed with electro-optical material upon or within a substrate 330 and traverses it from a first side of the substrate 300 to an opposite side thereof and back, so as to optically connect the input and output ports 301, 311 which in this embodiment are both located at the first side of the substrate 330. The first and second WPMs 310 and 320 include pairs of signal electrodes 347 and 346, respectively, that are disposed upon the substrate 330 about and alongside portions of the main optical waveguide 305 as described hereinabove with respect to WPM 110 of FIG. 1. A mirror 355 is provided at the opposite side of the substrate 330 from the input and output ports 301, 311 at a location where the main optical waveguide 305 folds, so as to reflect light propagating in the waveguide 105 from the input optical port 301 along the lower section of the waveguide 305 towards the output signal port 311. Advantageously, the folded configuration improves the utilization of the substrate 330 and reduces the size of the OWD 300.

In operation, light 10 is launched into the waveguide 305 through the input optical port 301 and propagates sequentially through the first WPM 310 and the second WPM 320. The first WPM 310 imparts upon the propagating light a first phase shift $\Phi_1$ in response to a first electrical drive signal $V_{dr1}(t)$ applied to the electrodes 347 of the first WPM 310, while the second WPM 320 imparts upon the propagating light a second phase shift $\Phi_2$ in response to a second electrical drive signal $V_{dr2}(t)$ applied to the electrodes 346 of the second WPM 320, so as to produce modulated light 1030 that leaves the output signal port 311 having acquired an optical phase $\Phi_{out}=(\Phi_1+\Phi_2)$. In one embodiment, the first electrical drive signal $V_{dr1}(t)$ switches between V=0 Volts and $\Delta V=V_{\pi1}$, while the second electrical drive signal $V_{dr2}(t)$ switches between V=0 Volts and $V=V_{\pi2}/2$, so that $\Phi_1$ takes one of two possible values $\Phi_{10}$ and $(\Phi_{10}+\Delta\Phi_1)$ with $\Delta\Phi_1=\pi$ radian, while $\Phi_2$ takes one of two possible values $\Phi_{20}$ and $(\Phi_{20}+\Delta\Phi_2)$ with $\Delta\Phi_2=\pi/2$ radian; here, $\Phi_{10}$ and $\Phi_{20}$ are voltage-independent phase offsets in the WPMs 310 and 320, and $V_{\pi1}$ and $V_{\pi2}$ are voltages that have to be applied to the first WPM 310 and the second WPM 320, respectively, in order to impart an additional voltage-dependent optical phase shift of $\pi$ radian, or 180 degrees, upon light propagating through the respective modulators. The total acquired optical phase $\Phi_{out}$ can then take one of four possible values ($\theta$, $\theta+\pi/2$, $\theta+\pi$, $\theta+3\pi/2$), where $\theta=\Phi_{10}+\Phi_{20}$, in accordance with the QPSK or DQPSK modulation format.

However, the $V_{1\pi}$ and $V_{2\pi}$ values, i.e. the voltage values that have to be applied to the first and second WPMs 310 and 320, respectively, in order to cause an optical phase shift of $\pi$ radian in the respective modulators, may change with time due to, for example, effects of temperature variations upon optical and electro-optic properties of the waveguide 305 and upon electrical properties of driving circuitry, or due to aging. This may cause actual values of the phase shifts $\Delta\Phi_1$ and $\Delta\Phi_2$ imparted by the first and second WPMs 310, 320 to deviate from the specified values of $\pi$ and $\pi/2$ radian, leading to imperfections in transmitted signal.

Advantageously, each of the WPMs 310 or 320 is provided with a respective WMS 350 or 360 coupled optically in parallel thereto so as to form the interferometric Mach-Zehnder configurations therewith, as described hereinabove with reference to the WMP 110 and WMS 150 of FIG. 1.

In particular, a first WMS 350 includes a first APM 335 that is connected optically in parallel with the first WPM 310 using first and second optical taps 315, 316, which tap off fractions of light entering and leaving the first WPM 310, respectively, and direct these tapped-off fractions of light towards a first optical monitor port 351. The tapped-off light from the first and second optical taps 315, 316 is combined using a first optical combiner 323, after the tapped-off light from the first optical tap 317 is first passed through the first APM 335 for imparting thereupon a first test phase shift $\phi_1$. The first monitor port 351 outputs first monitor light 1041 wherein the modulated tapped off light from the first optical tap 315 is mixed with the tapped off light from the second optical tap 316 that experienced a $\Phi_1$ phase shift in the first WPM 310. As a result, the first monitor light includes an intensity component that is indicative of the first phase shift $\Phi_1$ imparted by the first WPM 310, and varies in proportion to $\cos(\Phi_1-\phi_1+\phi_{10})$ in accordance with equation (1).

Similarly, a second WMS 360 includes a second APM 336 that is connected optically in parallel with the second WPM 320 using third and forth optical taps 317 and 318, which tap off fractions of light entering and leaving the second WPM 320, respectively, and direct these tapped-off fractions of light towards a second optical monitor port 361. The tapped-off light from the third and forth optical taps 317 and 318 is combined using a second optical combiner 324, after the tapped-off light from the third optical tap 317 is first passed through the second APM 335 for imparting thereupon a second test phase shift $\phi_2$. The second monitor port 361 outputs second monitor light 1042 wherein the modulated tapped off light from the third optical tap 317 is mixed with the tapped off light from the forth optical tap 318 that experienced the second phase shift $\Phi_2$ in the second WPM 320. As a result, the second monitor light 1042 includes an intensity component that is indicative of the second phase shift $\Phi_2$ imparted by the second WPM 320 and varies in proportion to $\cos(\Phi_2-\phi_2+\phi_{20})$ in accordance with equation (1).

When each of the first and second WPMs are PSK modulated with their respective data signals at the data rate R, a slow modulation of the first test phase shift $\phi_1$ at a test frequency that is much smaller than the data rate R results in a modulation of the averaged intensity of the first monitor light 1041; according to equation (3), strength of this intensity modulation is indicative of an actual value of the phase modulation amplitude $\Delta\Phi_1$ of the first phase shift $\Phi_1$ imparted by the first WPM 310. Similarly, a slow modulation of the second test phase shift $\phi_2$ results in a modulation of the averaged intensity of the second monitor light 1042 that is indicative of an actual value of the phase modulation amplitude $\Delta\Phi_2$ imparted by the second WPM 320. By detecting the intensity modulation of the first and second monitor light 1041, 1042 with intensity-sensitive low speed photodetectors, the phase shifts imparted by the WPMs 310 and 320 may be independently assessed.

Figure 4:
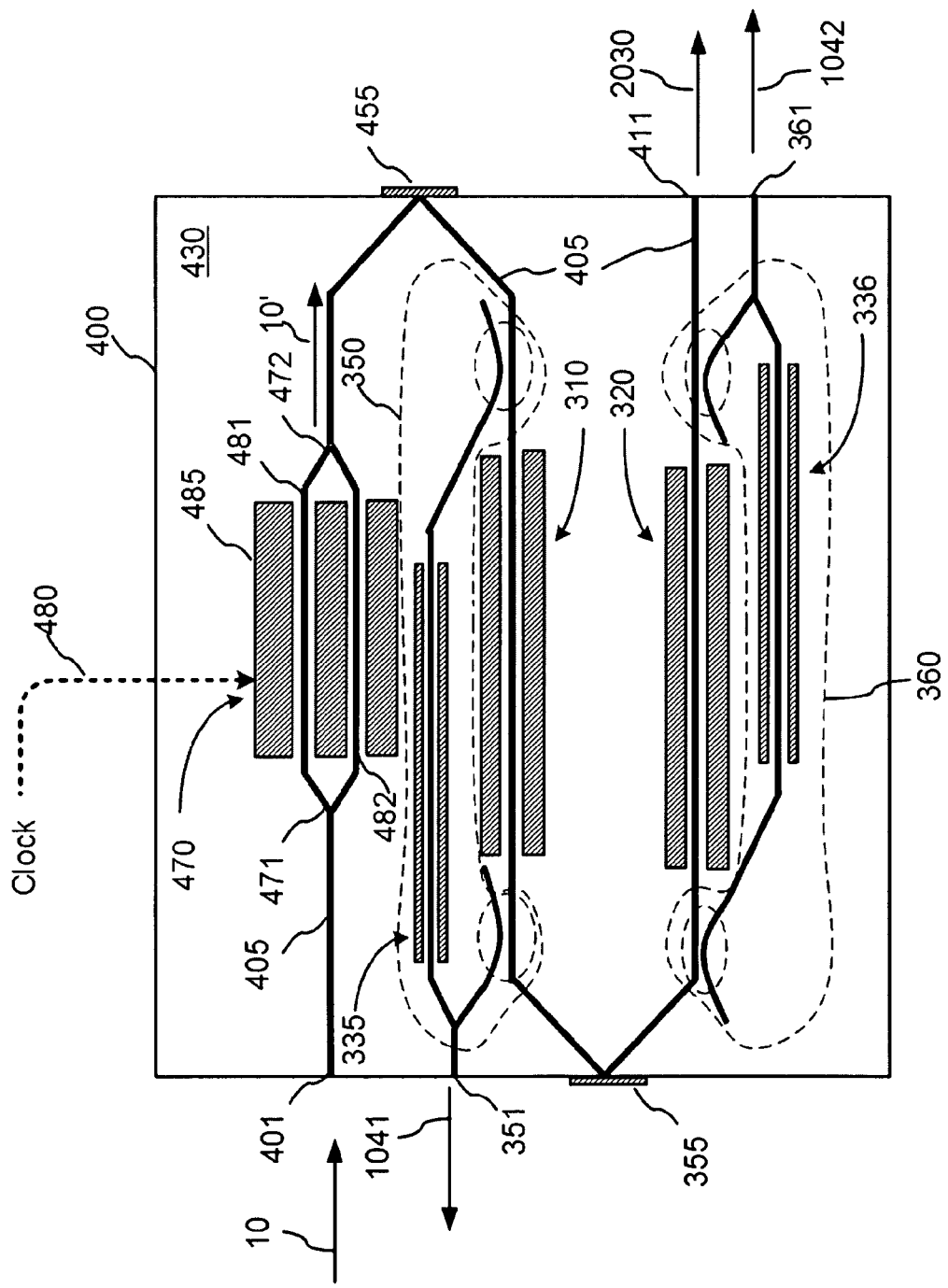
FIG. 4 is a diagram of an optical waveguide device including incorporating an RZ QPSK modulator with integrated phase monitoring structures.
Figure 5:
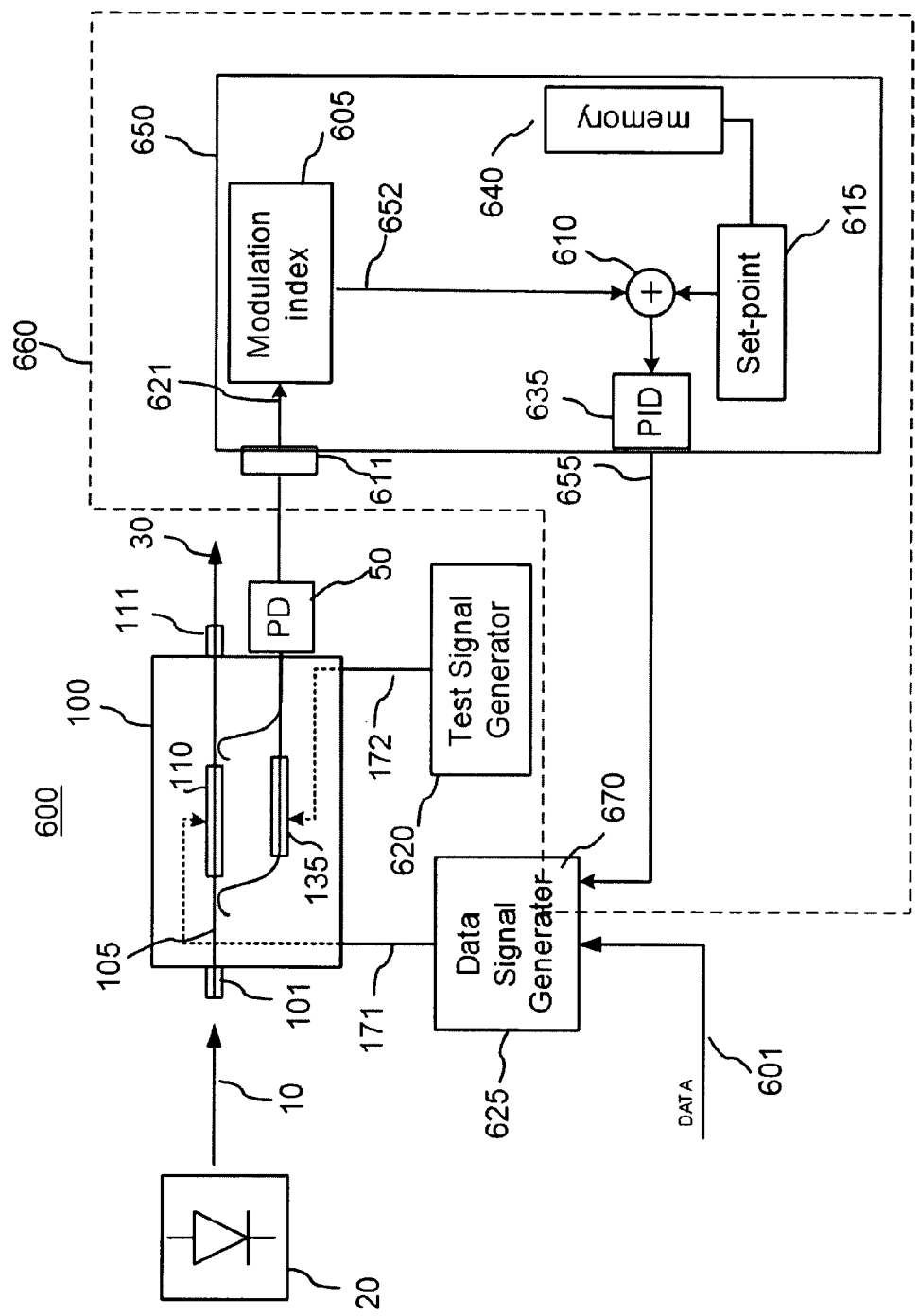
FIG. 5 is a block diagram of an optical modulator including a waveguide phase modulator with an integrated phase monitoring structure and a feedback circuit for controlling the phase modulation amplitude.

Referring now to FIG. 4, there is provided an OWD 400 according to a forth embodiment of the present invention. In this embodiment the OWD 400 is an optical RZ QPSK modulator, which, in addition to the first and second WPMs 310, 320 with the associated first and second integrated WMS 350, 360 that are described hereinabove with reference to FIG. 3, also includes a pulse carver 470 that is embodied as a waveguide MZM and is connected in series with the WPMs 310, 320 between an input optical port 401 and an output optical signal port 411. The OWD 400 has a double-folded configuration for efficient use of a wafer 430, in which or upon which the shown functional elements 470, 310, 335, 320, 336, as well as a main optical waveguide 405 traversing these functional elements and coupling the input optical port 401 with the output optical signal port 411, are formed. Mirrors 455 and 355 that are coupled to the main optical waveguide 405 are positioned at the waveguide folding locations to direct light along the folded waveguide 405 by means of reflection.

In operation, light 10 enters the OWD 400 via the input optical port 401, and propagates by way of the main optical waveguide 405 through the MZM 470, in which the main optical waveguide 405 is split into two waveguide arms 481 and 482 that are disposed optically in parallel to each other and coupled at the ends with an optical splitter 471 and an optical combiner 472. Three electrodes 485 are provided within the MZM 485 alongside and adjacent to the waveguide arms 481, 482 for biasing and driving the MZM 470 with an electrical clock signal 480 so as to form a train of optical pulses as known in the art, with a period equal to the duration of one (D)QPSK symbol. The MZM 470 produces light 10' in the form of the train of optical pulses; this light propagates along the main optical waveguide 405, reflects from the mirror 455, then traverses the serially connected first and second WPMs 310, 320 acquiring the optical phase shift $\Phi_{out}$ as described hereinabove with reference to FIG. 3, and exits the OWD 400 via the output optical signal port 411 as modulated light 2030. In some embodiments, the modulated light 411 is modulated according to the RZ QPSK or RZ DQPSK format, depending on a chosen pre-coding of data which shape the drive signals $V_{dr1}(t)$ and $V_{dr2}(t)$. In this embodiment, the first and second WMS 350 and 360 function as described hereinabove with reference to FIG. 3, enabling independent monitoring of the phase modulation amplitudes $\Delta\Phi_1$ and $\Delta\Phi_2$ of the first and second phase shifts $\Phi_1$, $\Phi_2$ imparted by the WPMs 310, 320.

Other embodiment of the present invention may utilize more than two WPMs connected in series forming a chain of WPMs, depending on a desired phase modulation format. In particular, an M-ary PSK (MPSK) or a differential M-ary PSK (DMPSK) modulation, where $M=2^n$ and n is an integer, can be realized using a chain of n WPMs connected in series, and wherein a k-th WPM is a $(\pi/2^{k-1})$-modulator, i.e. it imparts an optical phase shift equal to one of two possible values that differ by $\Delta\Phi_k=\pi/2^{k-1}$ radian, where $k=1, \ldots, n$. Here, the term "x-modulator" is used to mean an optical phase modulator that imparts an optical phase shift equal to one of two possible values that differ by x radian; such a modulator is also said to provide a phase modulation amplitude x.

Accordingly, embodiments of the present invention provide OWDs which include a plurality of WPMs formed upon or within a single substrate, each WPM having an associated integrated WMS that includes an APM and is coupled optically in parallel with the respective WPM so as to form a Mach-Zehnder interferometer (MZI) therewith, each WMS including a dedicated monitor port for providing monitor light indicative of the optical phase shift in the respective WPM.

For example, one such embodiment provides an optical MPSK modulator that includes a chain of $n=\log_2(M)$, $M=2$, 3, ... serially connected WMPs, wherein k-th WPM in the chain has a length $L_k$, $k=1, \ldots, n$, and wherein the plurality of the WPM lengths $L_k$ can be ordered to form a binary progression $\{L_1 \cdot 2^k\}=\{L_1, L_1 \cdot 2, \ldots L_1 \cdot 2^{n-1}\}$ wherein each WPM length is two times greater than the preceding WPM length. Advantageously, such WPMs may be driven by voltages of the same magnitude to provide the MPSK or DMPSK modulation. In practice, when the WPM lengths deviate from a binary progression, but are within about +/−30% of length corresponding to a binary progression, conserving the overall device length and drive voltage capability of the driving electronics may be still accomplished. In particular, it should be appreciated that although the WPMs 310 and 320 in FIGS. 3 and 4 are shown as having a similar length, these figures are not to scale, and the WPM 320 may be for example half as long as WPM 310, or vice versa; it is also appreciated that the length of each WPM is defined by the length of its electrodes, i.e. the length of electro-optical interaction in the WPM.

Another aspect of the present invention provides an optical modulator wherein a WPM having an integrated WMS, for example as illustrated in FIGS. 1-4, is supplied with monitoring and control (M&C) circuitry that in operation adjusts the electrical drive signal of the WPM responsive to an intensity modulation of the monitor light. The operation of the M&C circuitry is based on the observation noted hereinabove that, when the APM of the WMS is slowly modulated so as to repeatedly sweep the optical phase of the first or second tapped-off light at a suitably low test frequency f while the WPM is modulated at a much higher data rate $R \gg f$, a modulation index m of the monitor light intensity at the test frequency f is indicative of the phase modulation amplitude $\Delta\Phi$ imparted by the WPM upon the propagating light, and can be used to monitor the WPM and adjust the electrical drive signal as required.

An embodiment of the M&C circuitry for controlling the electrical drive signal of the WPM based on the monitor light from the integrated WMS of the present invention is described by way of example hereinbelow with reference to the OWD 100.

Referring to FIG. 5, an optical modulator 600 according to a fifth embodiment of the present invention includes the OWD 100, for example as described hereinabove with reference to FIG. 1, a data signal generator 625 electrically connected to the WPM 110 for generating the electrical drive signal 171 in response to a received binary data signal 601 so as to modulate the phase shift $\Phi$ with a pre-defined phase modulation amplitude $\Delta\Phi$, a test signal generator 620 electrically connected to the APM 135 for generating the electrical test signal 172, and a feedback circuit 660 electrically coupling the PD 50 and the data signal generator 625 for adjusting the drive signal 171 based on the electrical PD signal 621. In one embodiment, the electrical test signal 172 has an amplitude sufficient for modulating the optical phase of light propagating through the APM 135 by at least $2\pi$ radian.

In the shown embodiment, the feedback circuit 660 includes a control signal generator 650 electrically coupled between the PD 50 and the data signal generator 625 for generating a control signal $S_c$ 655 based on the electrical PD signal $S_p$ 621, and a voltage control circuit 670 for adjusting an amplitude of the drive signal $V_{dr}(t)$ 171 in response to the control signal $S_c$.

In operation, the data signal generator 625 generates the electrical drive signal $V_{dr}(t)$ 171 that alternates between two drive signal values $V_{min}$ and $V_{max}$ in response to a received binary data signal 601, which may carry information in the form of a sequence of bit values such as logical "1" and "0", or marks and spaces. In another embodiment, the electrical drive signal $V_{dr}(t)$ 171 may be a PRBS signal that is generated by the data signal generator 625 in the absence of the received data signal 601. The electrical drive current $V_{dr}(t)$ 171 may for example be an NRZ voltage signal wherein one bit value corresponds to $V_{min}=0$ Volts (V), and the other bit value corresponds to $V_{max}=V_{dr}$, where $V_{dr}$ is a non-zero peak drive voltage. The peak drive voltage $V_{dr}$ has a specified target value that is selected so as to provide a specified value of the phase modulation amplitude $\Delta\Phi$ by the WPM 110. For example, if the desired phase modulation amplitude $\Delta\Phi$ equals to $\Delta\Phi_k=\pi/2^{k-1}$, where k is an integer, the peak drive voltage $V_{dr}$ is set to equal $(V_{dr})_\pi/2^{k-1}$, where $(V_{dr})_\pi$ is a $V_\pi$ voltage of the WPM 110 that may be determined at the time of device calibration. However, over time the device aging, variations in the ambient temperature and/or variations of the wavelength of the light 10 may result in variations in the actual $V_\pi$ and/or $V_{dr}$ values, so that the peak drive voltage $V_{dr}$ provided by the data signal generator 625 starts to deviate from $(V_{dr})_\pi/2^{k-1}$, resulting in deviations of the phase modulation amplitude $\Delta\Phi$ from the specified value, for example the specified fraction of $\pi$ radian.

In order to monitor the actual phase modulation amplitude $\Delta\Phi$ imparted by the WPM 110 during the data transmission, the test signal generator 620 generates the electrical test signal $V_t(t)$ 172 at a low test frequency f that is much smaller than the data rate R, and applies this electrical test signal $V_t(t)$ 172 to the APM 135 to modulate the optical phase of the tapped-off light. Preferably, the electrical test signal $V_t(t)$ 172 has an amplitude $V_t$ that is sufficient for modulating the optical phase of the tapped-off light propagating through the APM 135 by at least $2\pi$ radians. By way of example, the data rate R is in the range of 1 Mb/s to 10 Gb/s, while the test frequency f is in the range from 100 Hz to 100 KHz.

The PD 50 is preferably a low-frequency low speed photodetector that has a bandwidth suitable for detecting an amplitude modulation of the received monitor light at the test frequency f while averaging out modulation components of the monitor light at the data rate R. Accordingly, it produces an electrical photodetector signal $S_{PD}(t)$ 621 that may have a modulation component at the test frequency f but is substantially insensitive to variations of the monitor light intensity at the data rate R. In other embodiments, the PD 50 may be either the low-frequency photodetector or a broad-band photodetector, and the control signal generator 650 includes a low-pass filter 611 at its input with a cut-off frequency about or greater the test frequency f but much smaller than the data rate R. The electrical photodetector signal $S_{PD}(t)$ 621 wherein the data rate variations are averaged out but variations due to the test signal are at least partly preserved is referred to hereinafter as the averaged PD signal $S_{PD}(t)$ 621. The PD 50 may be integrated in the same substrate or chip wherein the WPM 110 and the APM 135 are formed, or may be a physically separable device optically coupled to the OWD 100, for example using a lens or a fiber pigtail.

The control signal generator 650 includes a modulation index signal generator 605 coupled to the PD 50 for generating a modulation index signal $S_m$ 652 that is indicative of, for example proportional to, a modulation index m of the averaged PD signal $S_{PD}(t)$ 621 that is associated with the test frequency $f$ modulation. Here, the modulation index m represents a relative depth of the intensity modulation of the averaged PD signal 621 at the test frequency $f$, and may be defined as $$m = (S_{PDmax} - S_{PDmin})/(S_{PDmax} + S_{PDmin}), \quad (4)$$

where $S_{PDmax}$ and $S_{PDmin}$ are maximum and minimum values of the averaged PD signal $S_{PD}(t)$ 621 that are measured by the modulation index signal generator 605 when the APD 135 is modulated with the test signal.

By way of example, the modulation index signal generator 605 may include a DC detector and an AC detector connected in parallel to detect a DC component of the averaged PD signal $S_{PD}(t)$ 621 and an AC component thereof at the test frequency f, and a divider circuit for diving the AC component by the DC component to produce the modulation index signal $S_m$. One skilled in the art will appreciate that the modulation index signal generator 605 may be embodied using analog RF components or digitally using an analog to digital (A/D) converter followed by a suitably programmed microprocessor or an FPGA, as known in the art.

When the WPM 110 is digitally modulated at the high data rate R with equal probabilities of marks and spaces, the application of the test signal 172 to the APD 135 so as to repeatedly sweep the optical phase of the tapped-off light results in a modulation of the averaged PD signal $S_{PD}(t)$ 621 with the modulation index m that is uniquely related to the amplitude $\Delta\Phi$ of the phase modulation imparted by the WPM 110 on the propagating light. By comparing the modulation index signal $S_m$ to a reference signal $S_{ref}$ that corresponds to a specified value of the phase modulation amplitude $\Delta\Phi$, deviations of the actual phase modulation amplitude from the specified value thereof can be detected. This comparison is accomplished using a reference signal generator 615 for generating the reference signal $S_{ref}$ representing a pre-defined set point for the modulation index signal $S_m$, and a comparator 610 for generating the control signal $S_c$ based on comparing the modulation index signal $S_m$ with the reference signal $S_{ref}$. In one embodiment a memory 640 is provided for storing one or more values corresponding to one or more set points for the modulation index signal $S_m$, each set point corresponding to a particular design value of the phase modulation amplitude $\Delta\Phi$, as determined by a device calibration procedure. For example, the values stored in the memory 640 may correspond to values of the modulation signal $S_m$ generated by the modulation index signal generator 605 when the WPM 110 is driven so as to provide the phase modulation amplitude of $\Delta_{\Phi k} = \pi/2^{k-1}$, as verified, for example by independently measuring the optical phase modulation of the output light 30 of the OWD 100.

In particular, when the SPM 110 operates as a $\pi$-modulator, i.e. the optical phase shift imparted by the SPM 110 upon the output light 30 alternates between two values separated by $\pi$ radian with equal probability of marks and spaces, the averaged PD signal $S_{PD}(t)$ 621 is insensitive to the test modulation 172, so that the set point for the modulation index signal $S_m$ corresponds to the absence of modulation, i.e. $S_{ref} = 0$.

The memory 640 is coupled to the reference signal generator 615, which generates the reference signal $S_{ref}$ corresponding to a set point stored in the memory 640. This reference signal is provided to the comparator 610, which can be embodied as a differential adder, and which also receives the modulation index signal $S_m$ 652 from the modulation index signal generator 605. The comparator 610 then generates the control signal $S_c$ 655 based on the modulation index signal $S_m$ and the reference signal $S_{ref}$ for example by subtracting one from the other. The control signal $S_c$ 655 may for example be proportional to a difference between the reference signal $S_{ref}$ and the modulation index signal $S_m$:

$$S_c = a \cdot (S_m - S_{ref}), \quad (5)$$

or it may be generated from this difference by an optional PID controller 635 connected at the output of the comparator/differential adder 610. An electrical link provides the control signal $S_c$ 655 to a control port of the data signal generator 625 for adjusting the peak drive voltage $V_{dr}$ based on the control signal $S_c$ so as to reduce the deviation of the modulation index signal $S_m$ from the specified set point, thereby reducing deviations of the phase modulation amplitude $\Delta\Phi$ from the specified value.

The control signal generator 650 can be embodied in a variety of ways as would be known to those skilled in the art, including using an A/D converter and a microprocessor and/or FPGA, including using a microprocessor and/or FPGA that is shared with the data signal generator 625 and/or with the test signal generator 620.

Although the OWD 100 is shown in FIG. 5 to include only a single WPM 110 with its associated integrated WMS 135, in other embodiments of the optical modulator of the present invention the WPM 110 is one of a plurality of WPMs than may or may not be connected in series as described hereinabove and that are preferably formed with electro-optic material upon a single substrate, and further include a plurality of associated WPMs integrated upon the same substrate, with each WMS coupled optically in parallel to a different WPM and connected to a separate monitor port each having a dedicated photodiode so as to enable phase monitoring of the respective WPM separately, for example using a separate feedback circuit such as the feedback circuit 660 of FIG. 5 to connect respective photodiodes to data signal generators driving each WPM.

It should be understood that each of the preceding embodiments of the present invention may utilize a portion of another embodiment.

Of course numerous other embodiments may be envisioned without departing from the spirit and scope of the invention.

The invention claimed is:
1. An optical waveguide device, comprising:
  an input optical port for launching light therein;
  an output optical port for emitting modulated light;
  a first waveguide phase modulator (WPM) optically
    coupled between the input and output optical ports for imparting a first phase shift onto light propagating therethrough in response to an electrical drive signal; and, a first waveguide monitoring structure (WMS) coupled optically in parallel with the first WPM so as to form a Mach-Zehnder interferometer (MZI) therewith for producing monitor light indicative of the first phase shift imparted by the first WPM;

wherein the first waveguide monitoring structure comprises:

a first optical tap for tapping off a fraction of light entering the first WPM for providing first tapped-off light, a second optical tap for tapping off a fraction of light exiting the first WPM for providing second tapped off light, a monitor port optically coupled to the first and second optical taps for providing the monitor light wherein the first tapped-off light is mixed with the second tapped-off light, and an ancillary phase modulator (APM) for modulating the optical phase of one of the first and second tapped-off light with a test signal so as to modulate the intensity of the monitor light in dependence upon the first phase shift.

2. An optical waveguide device of claim 1, wherein the first waveguide phase modulator and the first waveguide monitoring structure are formed with an electro-optic material upon or within a same substrate.

3. An optical waveguide device of claim 1, wherein the monitoring structure includes an optical combiner coupled to the monitor port for combining the first and second tapped-off light.

4. An optical waveguide device of claim 3, wherein the optical combiner comprises a Y-junction waveguide coupler.

5. An optical waveguide device of claim 1, wherein the second optical tap is a waveguide optical coupler having a first output waveguide coupled to the output optical port, and a second output waveguide coupled to the monitor port.

6. An optical waveguide device of claim 1, wherein:

the first WPM comprises a waveguide formed with an electro-optic material, and a signal electrode positioned for imparting the first optical phase shift in response to an electrical drive signal;

the ancillary phase modulator comprises an ancillary waveguide optically coupled between the first and second optical taps, and a test electrode positioned for imparting the test phase signal upon light propagating in the ancillary waveguide in response to an electrical test signal.

7. An optical waveguide device of claim 1, further comprising:

a second WPM optically coupled between the input and output optical ports in series with the first WPM for imparting a second phase shift onto light propagating therethrough in response to a second electrical drive signal; and, a second waveguide monitoring structure coupled optically in parallel with the second WPM so as to form a Mach-Zehnder interferometer (MZI) therewith, the second WMS comprising a second APM and a second optical monitor port optically coupled thereto for providing second monitor light indicative of the second optical phase shift imparted by the second WPM.

8. An optical waveguide device of claim 1, comprising:

a substrate;

a plurality of WPMs formed with an electro-optic material upon the substrate and including the first WPM, the WPMs optically coupled in series between the input optical port and the output optical port for imparting phase shifts upon light propagating therethrough; and, a plurality of waveguide monitoring structures formed with an electro-optic material upon the substrate and including the first waveguide monitoring structure, wherein each of the waveguide monitoring structures is coupled optically in parallel with a different one of the WPMs so as to form a Mach-Zehnder interferometer (MZI) therewith, and includes a dedicated monitor port for providing monitor light indicative of the optical phase shift in the respective WPM.

9. An optical waveguide device of claim 1, further comprising a first photodetector optically coupled to the first monitor port for detecting the monitor light and for generating an electrical photodetector signal responsive to variations of the intensity of the monitor light associated with the test phase signal.

10. An optical waveguide device of claim 9, wherein the first photodetector, the first WPM and the first WMS are integrated on a single substrate.

11. An optical waveguide device of claim 9, further comprising a feedback circuit for adjusting the electrical drive signal applied to the first WPM.

12. An optical modulator comprising:

the optical waveguide device of claim 9;

a data signal generator for generating the electrical drive signal so as to modulate the first phase shift with a pre-defined phase modulation amplitude;

a test signal generator for generating the electrical test signal for modulating the optical phase of light propagating through the APM; and, a feedback circuit electrically coupling the first photodetector and the data signal generator for adjusting the drive signal based on the electrical photodetector signal, wherein the feedback circuit comprises a control signal generator for generating a control signal based on a modulation index of the electrical photodetector signal.

13. An optical modulator of claim 12, wherein in operation the electrical drive signal alternates between two drive signal values in response to a received data signal, and wherein the feedback circuit is for adjusting at least one of the two drive signal values.

14. An optical modulator of claim 12, wherein the control signal generator comprises:

a modulation index signal generator coupled to the photodetector for generating a modulation index signal indicative of the modulation index of the photodetector signal;

a reference signal generator for generating a reference signal representing a pre-defined set point for the modulation index signal; and, a comparator for generating the control signal based on comparing the modulation index signal with the reference signal.

15. An optical modulator of claim 14, further comprising memory coupled to the reference signal generator for storing values corresponding to a plurality of set points, each set point corresponding to a particular value of the phase modulation amplitude.

16. An optical modulator of claim 12, wherein the pre-defined phase modulation amplitude equals to $\pi/2^n$ radian, where n is zero or a positive integer.

17. An optical modulator of claim 16, wherein the pre-defined phase modulation amplitude equals to $\pi$ radian, and wherein the pre-defined set point corresponds to a substantially zero modulation index of the photodetector signal.

18. An optical modulator of claim 12, wherein the electrical test signal has an amplitude sufficient for modulating the optical phase of light propagating through the APM by at least $2\pi$ radian.

* * * * *

UNITED STATES PATENT AND TRADEMARK OFFICE
CERTIFICATE OF CORRECTION

PATENT NO. : 8,050,555 B2  Page 1 of 1
APPLICATION NO. : 12/250651
DATED : November 1, 2011
INVENTOR(S) : McBrien It is certified that error appears in the above-identified patent and that said Letters Patent is hereby corrected as shown below:

IN THE SPECIFICATIONS:

Col. 6, line 52, "$\alpha \leqq 1$" should read -- $\alpha \leq 1$ --

Signed and Sealed this
Fifteenth Day of May, 2012

David J. Kappos
*Director of the United States Patent and Trademark Office*